(12) United States Patent
Allen-Ware et al.

(10) Patent No.: US 8,943,341 B2
(45) Date of Patent: Jan. 27, 2015

(54) MINIMIZING POWER CONSUMPTION FOR FIXED-FREQUENCY PROCESSING UNIT OPERATION

(75) Inventors: Malcolm S. Allen-Ware, Austin, TX (US); Alan J. Drake, Round Rock, TX (US); Wei Huang, Austin, TX (US); Michael S. Floyd, Cedar Park, TX (US); Huajun Wen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/443,301

(22) Filed: Apr. 10, 2012

(65) Prior Publication Data

US 2013/0268785 A1    Oct. 10, 2013

(51) Int. Cl.
    *G06F 1/32*    (2006.01)
(52) U.S. Cl.
    USPC ........... 713/320; 713/300; 713/310; 713/321; 713/322; 713/323; 713/324; 713/330; 713/340
(58) Field of Classification Search
    USPC .................. 713/300, 310, 320–324, 330, 340
    See application file for complete search history.

(56) References Cited

U.S. PATENT DOCUMENTS

| | | | |
|---|---|---|---|
| 6,675,301 B1 | 1/2004 | Kurosawa | |
| 6,934,865 B2 | 8/2005 | Moritz et al. | |
| 7,071,723 B2 | 7/2006 | Krishnamoorthy et al. | |
| 7,148,755 B2 | 12/2006 | Naffziger et al. | |
| 7,352,297 B1 | 4/2008 | Rylyakov et al. | |
| 7,443,251 B2 | 10/2008 | Rylyakov et al. | |
| 7,467,050 B2 | 12/2008 | Douriet et al. | |
| 7,607,028 B2 | 10/2009 | Douriet et al. | |
| 7,720,621 B2 | 5/2010 | Weekly | |
| 7,886,172 B2 | 2/2011 | Bose et al. | |
| 7,937,563 B2 | 5/2011 | Naffziger et al. | |
| 2008/0082887 A1 | 4/2008 | Dhong et al. | |
| 2010/0191993 A1 | 7/2010 | Chaudhry et al. | |
| 2013/0268786 A1* | 10/2013 | Allen-Ware et al. ......... 713/320 |

FOREIGN PATENT DOCUMENTS

| | | |
|---|---|---|
| JP | 2008544355 A | 12/2008 |
| JP | 4585598 B1 | 11/2010 |

(Continued)

OTHER PUBLICATIONS

International Search Report (PCT/ISA/210) dated Jul. 2, 2013, International Application No. PCT/JP2013/002087, 3 pages.

(Continued)

*Primary Examiner* — M Elamin
(74) *Attorney, Agent, or Firm* — Francis Lammes; Stephen J. Walder, Jr.; William J. Stock

(57) ABSTRACT

A mechanism is provided for minimizing power consumption for operation of a fixed-frequency processing unit. A number of timeslots are counted in a time window where throttling is engaged to the fixed-frequency processing unit. The number of timeslots where throttling is engaged is divided by a total number of timeslots within the time window, thereby producing a performance loss (PLOSS) value. A determination is made as to whether determining whether the (PLOSS) value associated with the fixed-frequency processing unit is greater than an allowed performance loss (APLOSS) value. Responsive to the PLOSS value being less than or equal to the APLOSS value, a decrease in voltage supplied to the fixed-frequency processing unit is initiated.

18 Claims, 3 Drawing Sheets

(56) References Cited

FOREIGN PATENT DOCUMENTS

| | | |
|---|---|---|
| JP | 2010534890 A | 11/2010 |
| JP | 2011509461 A | 3/2011 |
| JP | 2011165215 A | 8/2011 |

OTHER PUBLICATIONS

Notification of Transmittal of the International Search Report and the Written Opinion of the International Searching Authority, or the Declaration (PCT/ISA/220) dated Jul. 2, 2013, International Application No. PCT/JP2013/002087, 2 pages.

Written Opinion of the International Searching Authority (PCT/ISA/237) dated Jul. 2, 2013, International Application No. PCT/JP2013/002087, 4 pages.

"Method and apparatus for efficient power management in se[r]ver design", www.ip.com, IPCOM000212180D, Nov. 3, 2011, 4 pages.

Baniasadi, Amirali et al., "Instruction Flow-Based Front-end Throttling for Power-Aware High-Performance Processors", The International Symposium on Low Power Electronics and Design (ISLPED'01), Huntington Beach, California, Aug. 6-7, 2001, pp. 16-21.

Brock, Bishop C. et al., "Performance Control of Frequency-Adapting Processors by Voltage Domain Adjustment", U.S. Appl. No. 12/827,432.

Skadron, Kevin et al., "Temperature-Aware Microarchitecture: Modeling and Implementation", ACM Transactions on Architecture and Code Optimization, vol. 1, No. 1, Mar. 2004, pp. 94-125.

U.S. Appl. No. 13/611,210.

\* cited by examiner

MINIMIZING POWER CONSUMPTION FOR FIXED-FREQUENCY PROCESSING UNIT OPERATION

BACKGROUND

The present application relates generally to an improved data processing apparatus and method and more specifically to mechanisms for minimizing power consumption for fixed-frequency processing unit operation.

Oftentimes, central processing unit (CPU) design focuses on one or more of datapaths, control units, memory components, clock circuitry, pad transceiver circuitry, logic gate cell libraries, or the like. CPUs designed for high-performance markets may require custom designs for each of these items to achieve a desired frequency, power-dissipation, chip-area goal, or the like. Therefore, a CPU design project generally comprises major tasks, such as: programmer-visible instruction set architecture, architectural study and performance modeling, high-level synthesis or logic implementation, circuit design of speed critical components, logic synthesis or logic-gate-level design, chip timing analysis to confirm that all logic and circuits will run at a specified operating frequency, physical design, as well as other design specifications.

Specific to chip timing is a nominal chip frequency, which is chosen based on worst-case corners often with large guard bands. Worst-case corners refer to all worst case conditions within a chip, such as highest possible temperature, worst possible workload, or the like. Large guard bands refers to additional voltage added for a given frequency of operation or a reduction in frequency for a given voltage to move away from an operational point where a chip timing failure has been demonstrated or projected to occur under some selected temperature and workload conditions. However, current technology is limited in reducing these large guard bands for chips with fully synchronous clocking grids. Further, for chips with asynchronous clocking grids, while guard bands may be reduced using dynamic frequency adjustments, these adjustments may not be made when the system bus frequency is equal to the core frequency, i.e. fixed frequencies.

SUMMARY

In one illustrative embodiment, a method, in a data processing system, is provided for minimizing power consumption for operation of a fixed-frequency processing unit. The illustrative embodiment counts a number of timeslots in a time window where throttling is engaged to the fixed-frequency processing unit. The illustrative embodiment divides the number of timeslots where throttling is engaged by a total number of timeslots within the time window thereby producing a performance loss (PLOSS) value. The illustrative embodiment determines whether the (PLOSS) value associated with the fixed-frequency processing unit is greater than an allowed performance loss (APLOSS) value. The illustrative embodiment initiates a decrease in voltage supplied to the fixed-frequency processing unit in response the PLOSS value being less than or equal to the APLOSS value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Voltage has never been adapted to minimize power consumption at run time for a system running with a fixed-frequency. The illustrative embodiments provide for minimizing power consumption for fixed-frequency processing unit operation. Previous approaches where frequency may be changed have been applied with voltage and frequency moving in relationship with one another or in relationship to the load on a chip. The drawback to this previous solution is that when running with a fixed-frequency, voltage may not be adapted to conserve energy and reduce power.

Most computer systems offer a nominal mode of operation, which is the normal operational, out-of-the-box mode in which most customers run their machine. Some systems employ a fully synchronous processor interconnection fabric, without asynchronous boundaries that could allow for isolated reductions in frequency. All processor cores and logic in this system must run in synchronous lock step. The performance advantages of such a synchronous design are no loss in performance due to asynchronous boundaries. However, the power disadvantage is a failure to be able to adjust voltage unless frequency is also adjusted across the entire system. The illustrative embodiments will lead to between a 5 to 10 percent reduction in chip power from the normal fixed voltage selected to cover worst case workload, temperature, di/dt noise, and life-time wear-out (e.g. negative bias temperature instability) characteristics. The percent reduction in chip power saved may depend on the current state of the above variables in the customer environment.

Figure 1:
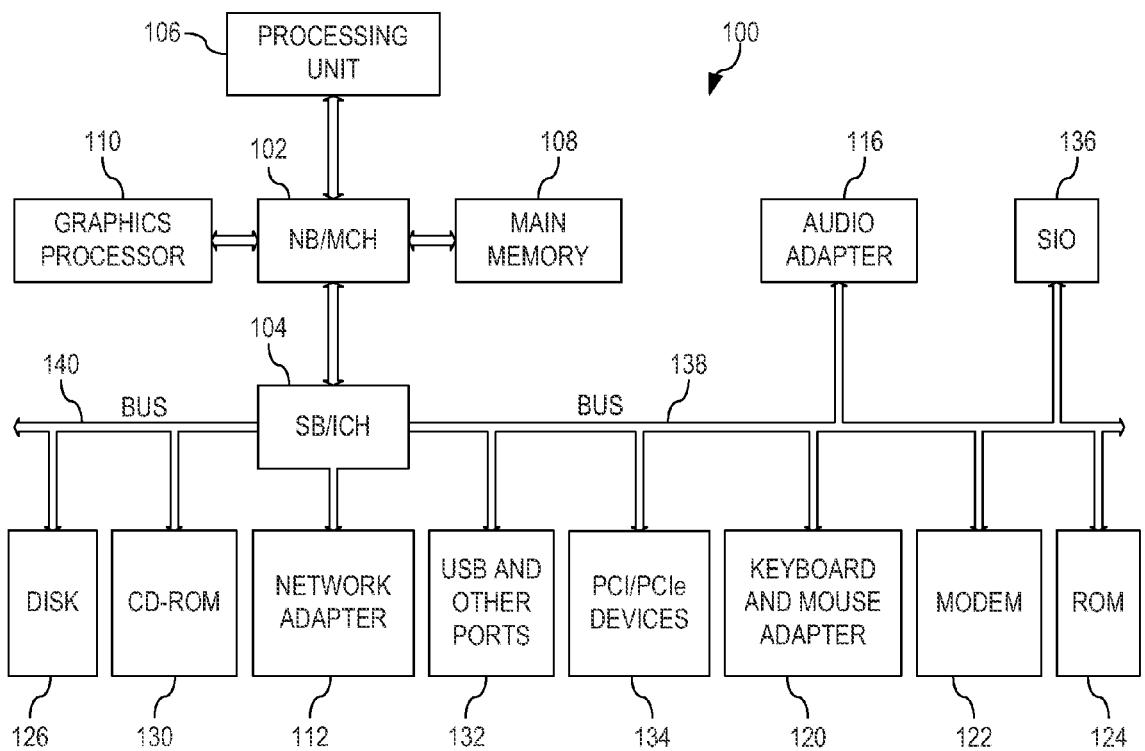
FIG. 1 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System p® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Again, the illustrative embodiments provide for minimizing power consumption for fixed-frequency processing unit operation. The illustrative embodiments introduce a throttling mechanism that may respond in 10 s of nanoseconds in response to critical path monitors (CPMs) and an output thermometer code. The CPMs identify instantaneously the slack in timing or lack thereof at many points within a voltage grid. The output thermometer code provides core throttling as necessary when the thermometer output indicates that the chip is close to a timing failure. Finally, an internal or external control mechanism executes an algorithm monitoring throttling counters and adjusts voltage in a manner so as to minimize the amount of throttling allowed to either none or very little, while also minimizing the required voltage to run the processing unit without a timing failure, at its minimum energy consumption level for the current operational conditions of the processing unit.

Figure 2:
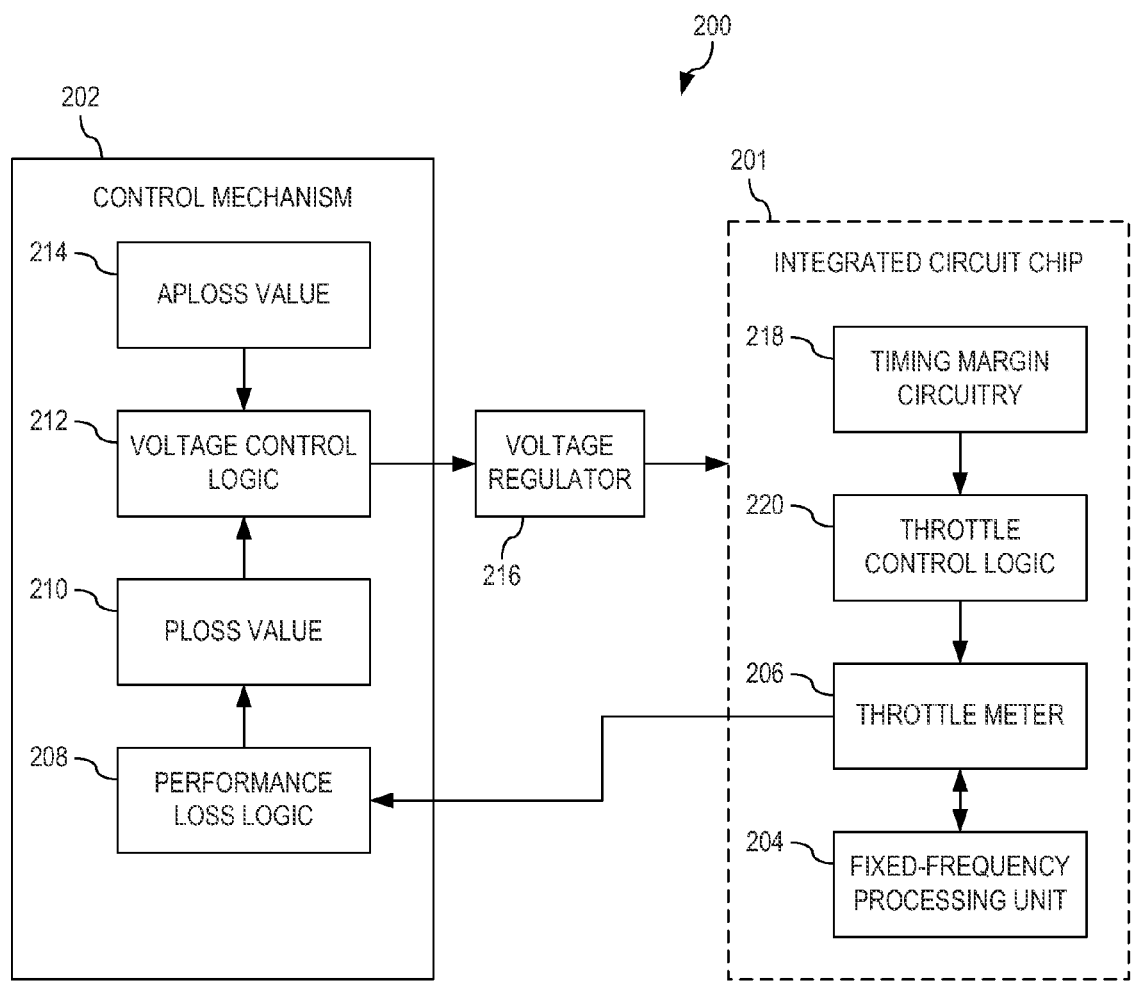
FIG. 2 depicts a functional block diagram of a monitoring and feedback mechanism for minimizing power consumption for fixed-frequency processing unit operation in accordance with an illustrative embodiment.

FIG. 2 depicts a functional block diagram of a monitoring and feedback mechanism for minimizing power consumption for fixed-frequency processing unit operation in accordance with an illustrative embodiment. Data processing system 200 comprises control mechanism 202 that is coupled to a processing unit 204, which is a fixed-frequency processing unit, within integrated circuit chip 201. While the illustrative embodiment are described with respect to a single processing unit 204, processing unit 204 may be a set of one or more processors and/or may be a multi-core processor, depending on the particular implementation on integrated circuit chip 201. Further, processor unit 204 may be implemented using one or more heterogeneous processor systems in which a main processor is present with secondary processors on a single chip, such as integrated circuit chip 201. As another illustrative example, processor unit 204 may be a symmetric multi-processor system containing multiple processors of the same type on integrated circuit chip 201.

Data processing system 200 also comprises throttle meter 206 that counts a number of timeslots within a predetermined time window where throttling is engaged. That is, in the illustrative embodiments, there is a predetermined time window and that predetermined time window is divided into timeslots. Thus, within an exemplary time window of 1 millisecond with an exemplary time slot of 10 nanoseconds, there would be 100,000 10 nanosecond time slots. Throttle meter 206 counts, for the time window, how many of those 10 nanosecond time slots are time slots where throttling is actively engaged. Alternatively, the predetermined time window may be a predetermined number of cycles and the timeslots could be an evenly divided subset of the predetermined number of cycles.

At the end of each predetermined time period, throttle meter 206 may either actively send the value of the counter within throttle meter 206 to performance loss logic 208 in control mechanism 202 or, alternatively, performance loss logic 208 may read the value of the counter within throttle meter 206 at the end of the predetermined time window. Performance loss logic 208 uses the value to determine a percent of time data processing system 200 spends throttling. To determine this percent, performance loss logic 208 divides the value obtained from throttle meter 206, i.e. 50,000 in this example, by the number of predetermined timeslots within the predetermined time window, which from the example above would be 100,000 10 nanosecond timeslots. Thus, performance loss logic 208 outputs a percentage of throttling that would be 50 percent, in this example as performance loss (PLOSS) value 210.

Voltage control logic 212 within control mechanism 202 uses PLOSS value 210 in conjunction with allowed performance loss (APLOSS) value 214 to control the throttling of processing unit 204 while minimizing the operation voltage by dynamically adjusting the voltage supplied to processing unit 204. APLOSS value 214 may be a pre-specified acceptable performance loss value that includes negligible performance loss. A negligible performance loss would be a loss that is not perceptible; however, in the illustrative embodiments, a one percent performance loss or less is not detectable and, thus, would be considered negligible. For example, if voltage control logic 212 determines that PLOSS value 210 is greater than APLOSS value 214, then voltage control logic 212 may send a signal to increase the voltage supplied to processing unit 204.

Additionally, if the voltage is to be increased, then, prior to sending the signal to increase the voltage to processing unit 204, voltage control logic 212 may determine whether the supply voltage (Vdd) is less than a nominal voltage (Vnom) plus a voltage guard band, which is usually 3% of the supply voltage (Vdd). If voltage control logic 212 determines that the supply voltage (Vdd) is less than the nominal voltage (Vnom) plus the voltage guard band, then voltage control logic 212 may send a signal to increase the voltage supplied to processing unit 204. However, if voltage control logic 212 determines that the supply voltage (Vdd) is greater than or equal to the nominal voltage (Vnom) plus the voltage guard band, voltage control logic 212 may leave the voltage at its current setting.

Further, if the voltage is to be increased, then, prior to sending the signal to increase the voltage to processing unit 204, voltage control logic 212 may determine whether there is thermal headroom to make the desired voltage change. That is, voltage control logic 212 may determine whether a temperature associated with processing unit 204 is less than a thermal threshold, such as 85° C. If voltage control logic 212 determines that the temperature associated with processing unit 204 is less than the thermal threshold, then voltage control logic 212 may send a signal to increase the voltage supplied to processing unit 204. However, if voltage control logic 212 determines that the temperature associated with processing unit 204 is greater than or equal to the thermal threshold, voltage control logic 212 may leave the voltage at its current setting. Thus, voltage control logic 212 may make one or more determinations with regard to the operating characteristics prior to increasing or decreasing the voltage supplied to processing unit 204.

Alternatively, if voltage control logic 212 determines that PLOSS value 210 is less than or equal to APLOSS value 214, then voltage control logic 212 may send a signal to decrease the voltage supplied to processing unit 204. Further, any increase or decrease in the voltage supplied to processing unit 204 may be based upon a metric, such as 0.5 percent of the supply voltage (Vdd).

Still further, so that voltage supplied to processing unit 204 is not increased during one time period, decreased in the following time period, and then increased in the following time period, voltage control logic 212 may utilize hysteresis control, where at least one or more time periods have to pass before a return to previous voltage setting may be implemented. If voltage is to be increased or decreased, voltage control logic 212 sends the signal to voltage regulator 216. Voltage regulator 216 then implements the desired change to the voltage supplied to processing unit 204.

Based on the supplied voltage changes implemented by control mechanism 202 as well as workload, temperature, as well as other characteristics associated with processing unit 204, additional and faster throttling measures will be requested to account for other issues, such as timing margin and errors. That is, control mechanism 202 implements voltage adjustments based on the performance of the fixed-frequency processing unit 204. However, due to the nature of the voltage regulation control loop, such voltage adjustments will always be associated with a microsecond time scale or longer, such as between 2 microseconds and 4 microseconds. However, in order to account for sudden changes in workload, which may cause timing margin errors, data processing system 200 also includes timing margin circuitry 218, which is comprised of detection circuits (such as the critical path monitor (CPM) circuit, RAZOR circuit, or the like) that monitor characteristics associated with processing unit 204, such as workload changes, temperature changes, and voltage changes, such as sudden drops in voltage, high increases in voltage not controlled by voltage regulator 216, workload increases, or the like, which cannot be responded to fast enough by control mechanism 202. Therefore, in order to avoid timing failures based on workload changes, temperature changes, and voltage changes, such as those issued by voltage regulator 216, timing margin circuitry 218 may engage throttling on a few nanoseconds time scale, such as between 10 nanoseconds and 40 nanoseconds. For example, when voltage control logic starts lowering voltage via voltage regulator 216, fixed-frequency processing unit 204 may move closer to a timing failure when issues such as those described above occur in conjunction with the voltage change. In order to avoid the timing failure, the detection circuits within timing margin circuitry 218 output a signal that causes throttling control logic 220 to engage on the few nanoseconds time scale. Throttling control logic 220 may engage throttling by decreasing workload, i.e. instructions. Thus, timing margin circuitry 218 accounts for such issues and makes fast throttling changes to processing unit 204. For any timeslot within the predetermined time window where throttling is engaged by timing margin circuitry 218, throttle meter 206 increments its counter, with the operation starting over again at the end of the predetermined time window. This throttling may be graduated such that the more loss of timing margin is detected; the more extreme throttling is engaged, thereby only hurting performance by the amount necessary to keep the system safe.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
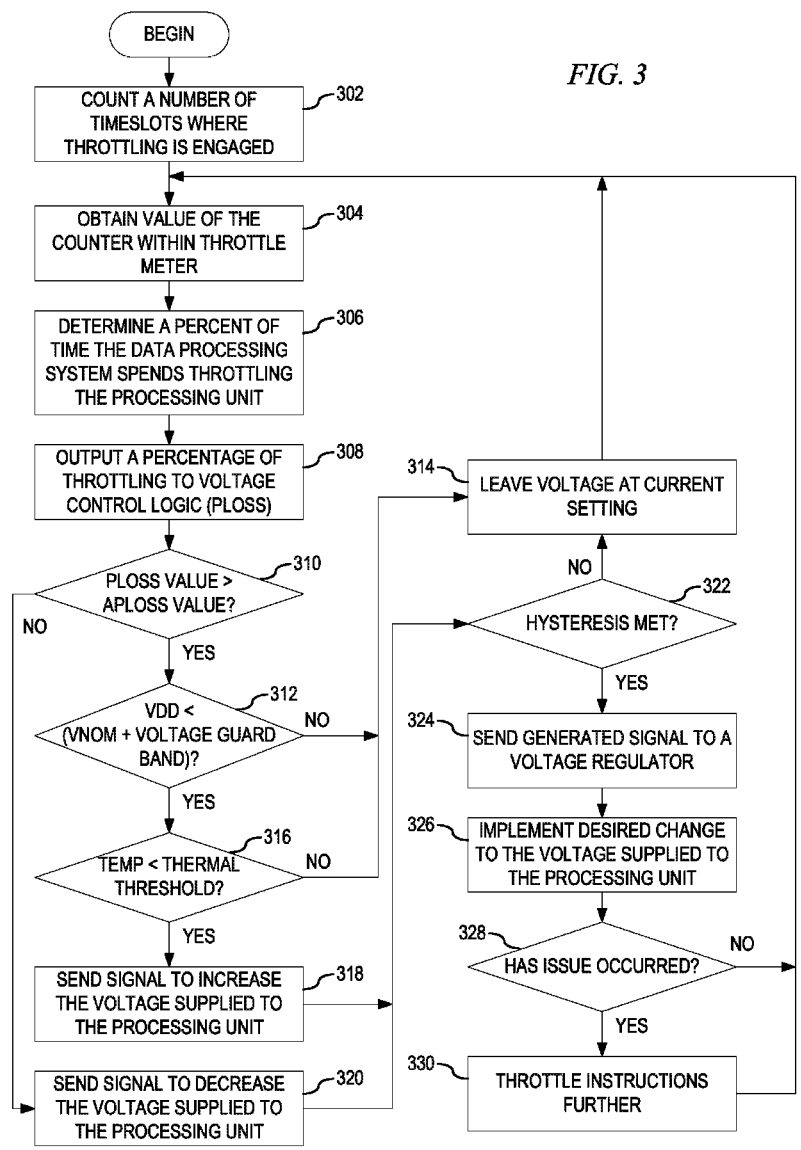
FIG. 3 depicts a flowchart of an operation performed by a monitoring and feedback mechanism for minimizing power consumption for fixed-frequency processing unit operation in accordance with an illustrative embodiment.

FIG. 3 depicts a flowchart of an operation performed by a monitoring and feedback mechanism for minimizing power consumption for fixed-frequency processing unit operation in accordance with an illustrative embodiment. As the operation begins, a throttle meter associated with a processing unit counts a number of timeslots where throttling is engaged to the processing unit during a predetermined time window or for a specified number of cycles (step 302). Once the specified time window has expired or the specified number of cycles has been met, the throttle meter sends the value of the counter that indicates the number of timeslots where throttling was engaged to the processing unit to performance loss logic in an internal or external control mechanism (step 304). The performance loss logic uses the value provided by the throttle meter to determine a percent of time the data processing system spends throttling the processing unit (step 306). The performance loss logic then outputs a percentage of throttling as a performance loss (PLOSS) value to voltage control logic within the control mechanism (step 308).

The voltage control logic uses the PLOSS value in conjunction with an allowed performance loss (APLOSS) value to control the throttling of processing unit while minimizing the operation voltage by dynamically adjusting the voltage supplied to the processing unit. In order to determine whether the voltage supplied to the processing unit should be increased, decreased or left at a current voltage, the voltage control logic determines whether the PLOSS value is greater than the APLOSS value (step 310). If at step 310 the voltage control logic determines that the PLOSS value is greater than the APLOSS value, then the voltage control logic determines whether a supply voltage (Vdd) is less than a nominal voltage (Vnom) plus a voltage guard band, which is usually 3% of the supply voltage (Vdd) (step 312). If at step 312 the voltage control logic determines that the supply voltage (Vdd) is greater than or equal to the nominal voltage (Vnom) plus the voltage guard band, then the voltage control logic leaves the voltage at its current setting (step 314). If at step 312 the voltage control logic determines that the supply voltage (Vdd) is less than the nominal voltage (Vnom) plus the voltage guard band, then the voltage control logic determines whether a temperature associated with the processing unit is less than a thermal threshold (step 316). If at step 316 the voltage control logic determines that the temperature associated with the processing unit is greater than or equal to the thermal threshold, the voltage control logic leaves the voltage at its current setting (step 314) with the operation returning to step 304 to wait for the next reading from the throttle meter. If at step 316 the voltage control logic determines that the temperature associated with the processing unit is less than the thermal threshold, then the voltage control logic sends a signal to increase the voltage supplied to the processing unit (step 318).

If at step 310 the voltage control logic determines that the PLOSS value is less than or equal to the APLOSS value, then the voltage control logic sends a signal to decrease the voltage supplied to the processing unit (step 320). From step 318 and 320 and prior to making adjustments to the voltage supplied to the processing unit, the voltage control logic may determine whether a hysteresis condition has been met, such as one or more time windows have passed or a pre-specified number of cycles have occurred since a last change in voltage supplied to the processing unit (step 322). If at step 322 the one or more time periods have not passed or the pre-specified number of cycles have not occurred, the voltage control logic does not forward the signal to either increase or decrease the voltage supplied to the processing unit and leaves the voltage at its current setting (step 314) with the operation returning to step 304 to wait for the next reading from the throttle meter. If at step 322 the one or more time windows have passed or the pre-specified number of cycles have occurred, the voltage control logic sends the generated signal to a voltage regulator (step 324). The voltage regulator then implements the desired change to the voltage supplied to the processing unit (step 326).

Based on the supplied voltage changes implemented by the control mechanism as well as workload, temperature, as well as other characteristics associated with processing unit, additional and faster throttling measures may be requested to account for other issues, such as timing margin and errors. Thus, timing margin circuitry within the data processing system determines whether an issue has occurred that requires further throttling during a current time period or pre-specified number of cycles (step 328). If at step 328 the timing margin circuitry determines that such an issue has occurred within the current time period or the pre-specified number of cycles, then the timing margin circuitry accounts for such issues by engaging throttling via throttle control logic such that fast throttling changes are made for the processing unit (step 330), with the operation returning to step 304 thereafter. If at step 328 the timing margin circuitry determines that no issues has occurred within the current time period or the pre-specified number of cycles, the operation simply returns to step 304.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for minimizing power consumption for fixed-frequency processing unit operation. The illustrative embodiments introduce a throttling mechanism that may respond in 10 s of nanoseconds in response to critical path monitors (CPMs) and an output thermometer code. The CPMs identify instantaneously the slack in timing or lack thereof at many points within a voltage grid. Finally, an internal or external control mechanism executes an algorithm monitoring the new throttling counters and adjusts voltage in a manner so as to minimize the amount of throttling allowed to either none or very little, while also minimizing the required voltage to run the processing unit without a timing failure, at its minimum energy consumption level for the current operational conditions of the processing unit.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:

count a number of timeslots in a time window where throttling is engaged to a fixed-frequency processing unit;

divide the number of timeslots where throttling is engaged by a total number of timeslots within the time window thereby producing a performance loss (PLOSS) value;

determine whether the (PLOSS) value associated with a processing unit is greater than an allowed performance loss (APLOSS) value; and responsive to the PLOSS value being less than or equal to the APLOSS value, initiate a decrease in voltage supplied to the fixed-frequency processing unit.

2. The computer program product of claim 1, wherein the computer readable program further causes the computing device to:

determine whether a timing issue exists for the fixed-frequency processing unit; and responsive to a timing issue existing, throttle the operation of the fixed-frequency processing unit, wherein the response to address the timing issue is faster than the response to adjust the voltage supplied to the fixed-frequency processing unit.

3. The computer program product of claim 2, wherein the timing issues are detected by timing margin circuitry.

4. The computer program product of claim 1, wherein the computer readable program further causes the computing device to:

responsive to the PLOSS value being greater than the APLOSS value, determine whether a supply voltage associated with the fixed-frequency processing unit is less than a nominal voltage plus a voltage guard band; and responsive to the supply voltage being is greater than or equal to the nominal voltage plus the voltage guard band, leave the voltage supplied to the fixed-frequency processing unit at a current setting.

5. The computer program product of claim 4, wherein the computer readable program further causes the computing device to:

responsive to the supply voltage being less than the nominal voltage plus the voltage guard band, determine whether a temperature associated with the fixed-frequency processing unit is less than a thermal threshold; and responsive to the temperature being greater than or equal to the thermal threshold, leave the voltage supplied to the fixed-frequency processing unit at the current setting.

6. The computer program product of claim 5, wherein the computer readable program further causes the computing device to:

responsive to the temperature being less than the thermal threshold, initiate an increase in voltage supplied to the fixed-frequency processing unit.

7. An apparatus, comprising:

a processor; and a memory coupled to the processor, wherein the memory comprises instructions which, when executed by the processor, cause the processor to:

count a number of timeslots in a time window where throttling is engaged to a fixed-frequency processing unit;

divide the number of timeslots where throttling is engaged by a total number of timeslots within the time window thereby producing a performance loss (PLOSS) value;

determine whether the (PLOSS) value associated with a processing unit is greater than an allowed performance loss (APLOSS) value; and responsive to the PLOSS value being less than or equal to the APLOSS value, initiate a decrease in voltage supplied to the fixed-frequency processing unit.

8. The apparatus of claim 7, wherein the instructions further cause the processor to:

determine whether a timing issue exists for the fixed-frequency processing unit; and responsive to a timing issue existing, throttle the operation of the fixed-frequency processing unit, wherein the response to address the timing issue is faster than the response to adjust the voltage supplied to the fixed-frequency processing unit.

9. The apparatus of claim 8, wherein the timing issues are detected by timing margin circuitry.

10. The apparatus of claim 7, wherein the instructions further cause the processor to:

responsive to the PLOSS value being greater than the APLOSS value, determine whether a supply voltage associated with the fixed-frequency processing unit is less than a nominal voltage plus a voltage guard band; and responsive to the supply voltage being is greater than or equal to the nominal voltage plus the voltage guard band, leave the voltage supplied to the fixed-frequency processing unit at a current setting.

11. The apparatus of claim 10, wherein the instructions further cause the processor to:

responsive to the supply voltage being less than the nominal voltage plus the voltage guard band, determine whether a temperature associated with the fixed-frequency processing unit is less than a thermal threshold; and responsive to the temperature being greater than or equal to the thermal threshold, leave the voltage supplied to the fixed-frequency processing unit at the current setting.

12. The apparatus of claim 11, wherein the instructions further cause the processor to:

responsive to the temperature being less than the thermal threshold, initiate an increase in voltage supplied to the fixed-frequency processing unit.

13. The computer program product of claim 1, wherein the computer readable program further causes the computing device to:

prior to adjusting the voltage supplied to the fixed-frequency processing unit, determine whether a hysteresis condition has been met; and responsive to the hysteresis condition failing to be met, leave the voltage supplied to the fixed-frequency processing unit at the current setting.

14. The computer program product of claim 13, wherein the hysteresis condition is whether a pre-specified number of time windows have passed since a last change in voltage supplied to the fixed-frequency processing unit.

15. The computer program product of claim 13, wherein the computer readable program further causes the computing device to:

responsive to the hysteresis condition being met, adjusting the voltage supplied to the fixed-frequency processing unit.

16. The apparatus of claim 7, wherein the instructions further cause the processor to:

prior to adjusting the voltage supplied to the fixed-frequency processing unit, determine whether a hysteresis condition has been met; and responsive to the hysteresis condition failing to be met, leave the voltage supplied to the fixed-frequency processing unit at the current setting.

17. The apparatus of claim 16, wherein the hysteresis condition is whether a pre-specified number of time windows have passed since a last change in voltage supplied to the fixed-frequency processing unit.

18. The apparatus of claim 16, wherein the instructions further cause the processor to:
responsive to the hysteresis condition being met, adjusting the voltage supplied to the fixed-frequency processing unit.

* * * * *